(12) United States Patent
Chen

(10) Patent No.: US 11,828,970 B1
(45) Date of Patent: Nov. 28, 2023

(54) FLEXIBLE DISPLAY

(71) Applicant: Zhejiang Tianyue Technology Co., Ltd, Zhejiang (CH)

(72) Inventor: Junhua Chen, Zhejiang (CH)

(73) Assignee: ZHEJIANG TIANYUE TECHNOLOGY CO., LTD, Zhejiang (CN)

(*) Notice: Subject to any disclaimer, the term of this patent is extended or adjusted under 35 U.S.C. 154(b) by 0 days.

(21) Appl. No.: 17/287,798

(22) PCT Filed: Dec. 23, 2020

(86) PCT No.: PCT/CN2020/138723
§ 371 (c)(1),
(2) Date: Apr. 22, 2021

(87) PCT Pub. No.: WO2022/088453
PCT Pub. Date: May 5, 2022

(30) Foreign Application Priority Data

Nov. 2, 2020 (CN) .......................... 202011204248.1

(51) Int. Cl.
*G02B 6/00* (2006.01)
*F21V 8/00* (2006.01)
*F21V 23/04* (2006.01)

(52) U.S. Cl.
CPC .......... *G02B 6/005* (2013.01); *F21V 23/0464* (2013.01); *G02B 6/0036* (2013.01); *G02B 6/0065* (2013.01)

(58) Field of Classification Search
CPC ...... A41D 13/01; A41D 27/085; G02B 6/005; G02B 6/0036; G02B 6/0065; F21V 33/0008; G09F 9/301; G09F 13/0468
See application file for complete search history.

(56) References Cited

U.S. PATENT DOCUMENTS 10,852,582 B2   12/2020   Zhu et al.
11,215,857 B2   1/2022    Wang et al.
(Continued)

FOREIGN PATENT DOCUMENTS

CN   1567055 A      1/2005
CN   104523259 A    4/2015
(Continued)

OTHER PUBLICATIONS

Office Action, Chinese Patent Application No. 202011204248.1, dated 2023.
International Search Report, PCT/CN2020/138723, dated 2021.

*Primary Examiner* — Julie A Bannan
(74) *Attorney, Agent, or Firm* — Robert C. Netter, Jr.; Dann, Dorfman, Herrell & Skillman

(57) ABSTRACT

Provided is a flexible display. The flexible display includes a flexible substrate, a flexible light guide film, a first light-scattering film, a first light-shielding film, a first color film and an LED light source disposed on the side of the flexible light guide film, and the flexible substrate, the flexible light guide film, the first light-scattering film, the first light-shielding film, and the first color film are sequentially stacked. The first color film includes a first pattern area and a first non-display area. The first light-shielding film includes a first light-shielding area and a first light-transmittance area. The flexible light guide film includes a first polymer film. The first polymer film includes multilayer-structured nanoscale light-scattering particles uniformly distributed. Each multilayer-structured nanoscale light-scattering particle includes a nanoparticle and a second polymer layer coating the nanoparticle.

13 Claims, 3 Drawing Sheets

(56) References Cited

U.S. PATENT DOCUMENTS

| | | | | |
|---|---|---|---|---|
| 2010/0289983 | A1* | 11/2010 | Rocard | G02B 6/0036 |
| | | | | 349/84 |
| 2011/0051412 | A1* | 3/2011 | Jeong | G02F 1/133611 |
| | | | | 362/235 |
| 2011/0261290 | A1 | 10/2011 | Kim et al. | |
| 2017/0012245 | A1 | 1/2017 | Xiang et al. | |
| 2017/0139111 | A1 | 5/2017 | Komura et al. | |
| 2022/0269130 | A1* | 8/2022 | Chou | G02B 6/0051 |

FOREIGN PATENT DOCUMENTS

| | | | |
|---|---|---|---|
| CN | 206773231 | U | 12/2017 |
| CN | 107731801 | A | 2/2018 |
| CN | 108415117 | A | 8/2018 |
| CN | 109461827 | A | 3/2019 |
| CN | 209117905 | U | 7/2019 |
| CN | 110426856 | A | 11/2019 |
| CN | 211315816 | U | 8/2020 |
| CN | 111755586 | A | 10/2020 |
| CN | 211608320 | U | 10/2020 |
| WO | 2012/021643 | A2 | 2/2012 |
| WO | 2019/046215 | A1 | 3/2019 |

\* cited by examiner

FLEXIBLE DISPLAY

CROSS-REFERENCE TO RELATED APPLICATIONS

This application is a National Stage Application, filed under 35 U.S.C. 371, of International Patent Application No. PCT/CN2020/138723, filed on Dec. 23, 2020, which claims priority to Chinese Patent Application No. 202011204248.1 filed Nov. 2, 2020, the disclosures of which are incorporated herein by reference in their entirety.

TECHNICAL FIELD

The present application relates to the flexible display technology, for example, a flexible display.

BACKGROUND

With the improvement of people's living standards, wearable products such as masks are more and more commonly used during holidays and in many activity venues. In addition to conventional facial masks, light-emitting wearable products such as light-emitting masks are gradually loved by consumers.

Wearable products such as light-emitting masks have the following issues: (1) the displays need an operating voltage of 110 V, which is unsafe and not convenient to use the displays; (2) these products cannot be bent or curled.

SUMMARY

The present application provides a flexible display. The flexible display has a low working voltage and low power consumption. Moreover, the flexible display still has a relatively good display effect when bent at a large angle.

An embodiment provides a flexible display. The flexible display includes a flexible substrate, a flexible light guide film, a first light-scattering film, a first light-shielding film, a first color film, and a light-emitting diode (LED) light source disposed on a side of the flexible light guide film, and the flexible substrate, the flexible light guide film, the first light-scattering film, the first light-shielding film, and the first color film are sequentially stacked.

The first color film includes a first pattern area and a first non-display area. The first light-shielding film includes a first light-shielding area and a first light-transmittance area. The first light-transmittance area is configured such that a vertical projection of the first light-transmittance area on the first color film covers the first pattern area, and the first light-shielding area is configured such that a vertical projection of the first light-shielding area on the first color film covers the first non-display area.

The flexible light guide film includes a first polymer film. The first polymer film includes multilayer-structured nanoscale light-scattering particles uniformly distributed. Each multilayer-structured nanoscale light-scattering particle includes a nanoparticle and a second polymer layer coating the nanoparticle, and each multilayer-structured nanoscale light-scattering particle has a particle size less than one-tenth of the wavelength of light emitted by the LED light source. The nanoparticle includes nanoscale amorphous silicon dioxide or nanoscale cerium oxide. A surface of the first polymer film is provided with multiple light-scattering microstructures.

DETAILED DESCRIPTION

Figure 1:
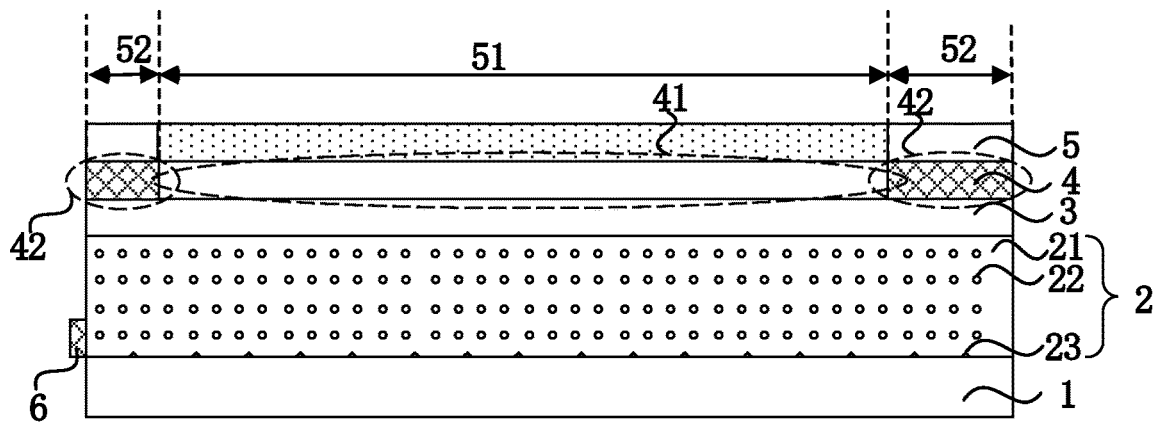
FIG. 1 is a schematic view of a flexible display according to an embodiment.

This embodiment provides a flexible display. FIG. 1 is a schematic view of a flexible display according to an embodiment. Referring to FIG. 1, the display includes a flexible substrate 1, a flexible light guide film 2, a first light-scattering film 3, a first light-shielding film 4, a first color film 5 and an LED light source 6 disposed on a side of the flexible light guide film 2, and the flexible substrate 1, the flexible light guide film 2, the first light-scattering film 3, the first light-shielding film 4, and the first color film 5 are sequentially stacked. The first color film 5 includes a first pattern area 51 and first non-display areas 52. The first light-shielding film 4 includes a first light-transmittance area 41 and first light-shielding areas 42. A vertical projection of the first light-transmittance area 41 on the first color film 5 covers the first pattern area 51, and a vertical projection of a first light-shielding area 42 on the first color film 5 covers the corresponding first non-display area 52.

The flexible light guide film 2 includes a first polymer film 21. The first polymer film 21 includes multilayer-structured nanoscale light-scattering particles 22 uniformly distributed. Each multilayer-structured nanoscale light-scattering particle 22 includes a nanoparticle and a second polymer layer coating the nanoparticle, and each multilayer-structured nanoscale light-scattering particle 22 has a particle size less than one-tenth of a wavelength of light emitted by the LED light source 6. The nanoparticle includes nanoscale amorphous silicon dioxide or nanoscale cerium oxide. A surface of the first polymer film 21 is provided with multiple light-scattering microstructures 23.

The flexible substrate 1 plays a supporting role and a drive circuit for driving the LED light source 6 to emit light may be disposed on the flexible substrate 1. The LED light source 6 may be an LED lamp. By using the LED light source 6, the operating voltage of the flexible display can be reduced such that the operating voltage is reduced from 110 V to below 6 V, which is safe and environmentally friendly, and power consumption can be reduced. Moreover, the LED light source may have a variety of different luminous colors, and the light-emitting flexibility of the light source and the diversity of patterns of the flexible display can be improved.

The flexible light guide film 2 is configured to transmit the light emitted by the LED light source 6 and uniformly emit the light emitted by the LED light source 6 over an entire surface. Since the light-emitting uniformity of the flexible light guide film 2 in the display directly affects the display effect, in order to ensure that the flexible display still has a relatively good display effect after being bent, the multilayer-structured nanoscale light-scattering particles 22 uniformly distributed in the first polymer film 21 are used in the flexible light guide film 2 of this embodiment, and the surface of the first polymer film 21 is provided with the multiple light-scattering microstructures 23.

In a case where the particle size of nanoscale amorphous silicon dioxide and nanoscale cerium oxide is much less than the wavelength of the light, the nanoscale amorphous silicon dioxide and nanoscale cerium oxide have excellent light-scattering performance, therefore, by setting the particle size of each multilayer-structured nanoscale light-scattering particle 22 less than one-tenth of the wavelength of the transmitted light, it can be ensured that the multilayer-structured nanoscale light-scattering particles 22 have excellent light-scattering performance. Moreover, the second polymer layer coats the nanoparticle so that the multilayer-structure nanoscale light-scattering particles 22 can be uniformly distributed in the first polymer film 21, and the flexible light guide film 2 has an excellent light-scattering performance. In addition, by providing the light-scattering microstructures 23 on the surface of the first polymer film 21, the total reflection at the surface of the first polymer film 21 can be prevented, so the light can be scattered in every direction on this surface, the light-scattering effect inside the flexible light guide film 2 can be further improved; it can be further ensured that the light is uniformly emitted at each position in a case where the flexible light guide film 2 is bent at a large angle, and thus the flexible display still has a relatively good display effect when bent at a large angle.

In an embodiment, when the transmitted light is blue, the particle size of each multilayer-structured nanoscale light-scattering particle 22 is less than 40 nm, and the particle size of the nanoparticle is less than 10 nm. Furthermore, each light-scattering microstructure 23 may be a groove or a protrusion, exemplary, the groove may be cone-shaped, cylindrical, or cubic. The first polymer and the second polymer may be the same polymer or different polymers.

The first light-scattering film 3 may further uniformly scatter the light so that the light can be emitted more uniformly. The LED light source 6 may be converted into a surface light source by using the flexible light guide film 2 and the first light-scattering film 3, which is safer for human eyes and more comfortable for viewing.

The first light-transmittance area 41 allows light to pass through, and the first light-shielding area 42 does not allow light to pass through. The first pattern area 51 has a pattern having a certain color. The first pattern area 51 corresponds to the first light-transmittance area 41, and when the LED light source 6 is turned on, the light emitted by the LED light source 6 is uniformly emitted through the flexible light guide film 2 and the first light-scattering film 3 and irradiates the first pattern area 51 through the first light-transmittance area 41. The color of the light emitted by the LED light source 6 may be the same as or different from the pattern color of the first pattern area 51. In an embodiment, when the pattern color of the first pattern area 51 is yellow, the LED light source 6 may emit yellow light, and the yellow light irradiates the first pattern area 51 to illuminate the pattern of the first pattern area 51.

The flexible display provided in this embodiment includes the flexible substrate 1, the flexible light guide film 2, the first light-scattering film 3, the first light-shielding film 4, and the first color film 5 and the LED light source disposed on the side of the flexible light guide film. The flexible light guide film is formed by the multilayer-structured nanoscale light-scattering particles uniformly distributed in the first polymer film. Each multilayer-structured nanoscale light-scattering particle includes the nanoparticle and the second polymer layer coating the nanoparticle. The nanoparticle includes nanoscale amorphous silicon dioxide or nanoscale cerium oxide. In a case where nanoscale amorphous silicon dioxide and nanoscale cerium oxide have relatively small sizes, nanoscale amorphous silicon dioxide and nanoscale cerium oxide have excellent light-scattering performance, therefore, the particle size of each multilayer-structured nanoscale light-scattering particle is less than one-tenth of the wavelength of the transmitted light so that it can be ensured that each multilayer-structured nanoscale light-scattering particle has excellent light-scattering performance. Through the second polymer layer coating the nanoparticle, the multilayer-structured nanoscale light-scattering particles can be uniformly distributed in the first polymer film. Moreover, by providing the light-emitting microstructures on the surface of the first polymer film, it can be ensured that the light is uniformly emitted at each position on the light-emitting surface when the entire flexible light guide film is bent at a large angle, and thus the flexible display still has a relatively good display effect when bent at a large angle. In addition, the first light-scattering film further scatters the light, which makes the emitted light safer for human eyes and more comfortable for viewing. By using the LED light source, the operating voltage of the flexible display can be reduced, which is safe and environmentally friendly, and power consumption can be reduced. The LED light source may have a variety of different luminous colors so that the light-emitting flexibility of the light source and the diversity of patterns of the flexible display can be improved.

In an embodiment, the light-scattering microstructures 23 of the flexible light guide film 2 may be disposed on the surface of the flexible light guide film 2 away from the first light-scattering film 3 as shown in FIG. 1, or both the surface of the flexible light guide film 2 away from the first light-scattering film 3 and the surface of the flexible light guide film 2 close to the first light-scattering film 3 are provided with the light-scattering microstructures 23, which is not limited in the present embodiment as long as the light-scattering effect of the flexible light guide film 2 can be enhanced and the light-emitting performance of the flexible light guide film 2 when the flexible light guide film 2 is bent at a large angle can be improved. Moreover, the light-scattering microstructures 23 may be formed by manners such as the laser surface treatment. FIG. 1 only shows that the LED light source 6 is disposed on one side of the flexible light guide film 2, which does not limit the present application. In other embodiments, the LED light source 6 may be disposed around the side of the flexible light guide film 2.

Figure 2:
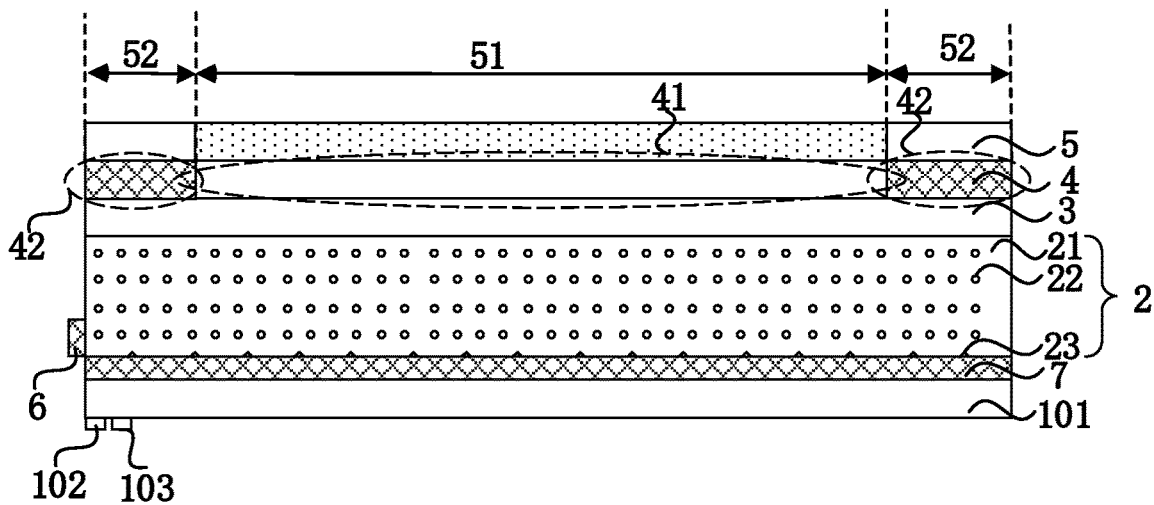
FIG. 2 is a schematic view of another flexible display according to an embodiment.

FIG. 2 is a schematic view of another flexible display according to an embodiment. Referring to FIG. 2, this flexible display further includes a light-reflecting film 7. The light-reflecting film 7 is disposed between the flexible light guide film 2 and the flexible substrate 1.

In an embodiment, the light-reflecting film 7 is configured to reflect the light emitted to one side of the flexible substrate 1 through the flexible light guide film 2 so that the light is reflected to the flexible light guide film 2 and the light-emitting rate in a direction from the flexible light guide film 2 to the first light-scattering film 3 can be improved, thereby reducing the loss of light energy, improving the utilization rate of light energy, and increasing the display brightness of the flexible display.

In an embodiment, the light-reflecting film 7 may be disposed on an entire surface to increase display brightness of the entire surface of the flexible display. The light-reflecting film 7 may also be disposed in a preset area. The preset area may correspond to an area where the flexible display has relatively dark display brightness, so as to improve the display brightness of the preset area and the display uniformity of the flexible display. Furthermore, the light-reflecting film 7 may be formed by spraying reflective paint on the surface of the flexible light guide film 2 or may be formed in other manners, which is not limited in this embodiment.

In an embodiment, referring to FIG. 2, the flexible substrate 1 includes a substrate 101, a drive circuit 102 disposed on the substrate 101, and a power supply 103 disposed on the substrate 101. The drive circuit 102 is electrically connected to the power supply 103 and the LED light source 6, respectively. The drive circuit 102 is configured to drive the LED light source 6 to emit light.

In an embodiment, the drive circuit 102 may drive the LED light source 6 to emit light by using different driving modes. The driving modes may include a constant brightness mode, a flash mode, a brightness gradient mode, and a brightness hopping mode. The constant brightness mode means that the LED light source 6 emits light with constant brightness. The flash mode means that the LED light source 6 turns on and off alternately. The brightness gradient mode means that the brightness of the LED light source 6 gradually increases or gradually decreases. The brightness hopping mode means that the brightness of the LED light source 6 hops with a certain regularity. In an embodiment, the drive circuit 102 may include a dimming switch, the dimming switch is electrically connected to the drive circuit 102, and different driving modes of the drive circuit may be triggered by adjusting the dimming switch.

In an embodiment, the power supply 103 includes a button cell. Due to the small volume and high safety of the button cell, the volume and weight of the flexible display can be reduced and the safety of the user can be ensured by using the button cell. Since the energy consumption of the surface light source is relatively low, a relatively long use time of the flexible display can be ensured by using the button cell. The flexible display provided in this embodiment can keep on for more than 24 hours by using a general button cell.

Figure 3:
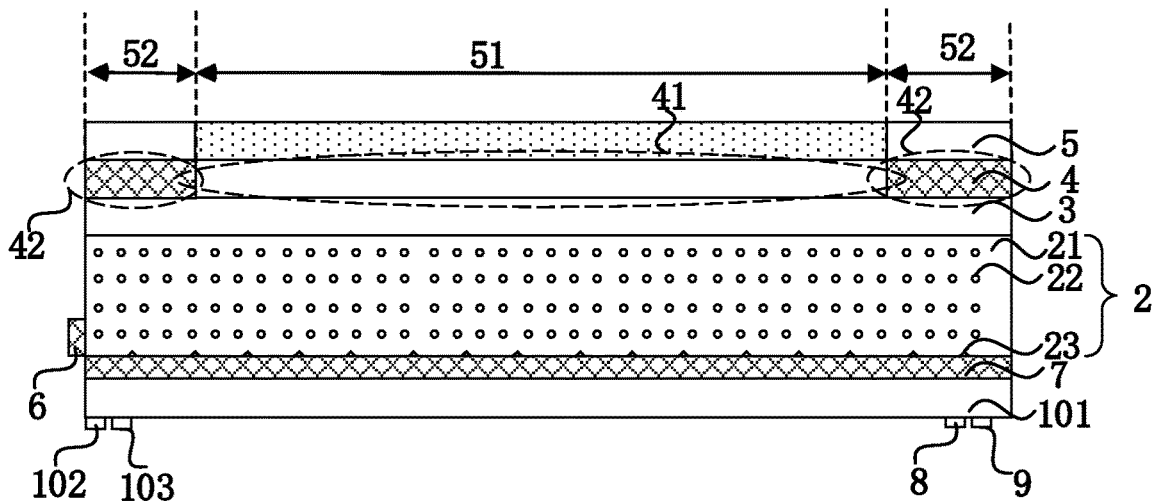
FIG. 3 is a schematic view of another flexible display according to an embodiment.

In an embodiment, FIG. 3 is a schematic view of another flexible display according to an embodiment. Referring to FIG. 3, this flexible display further includes a physiological parameter detection module 8. The physiological parameter detection module 8 is configured to detect a physiological parameter of a user of the flexible display and send the physiological parameter to the drive circuit 102. The drive circuit 102 is configured to adjust a luminous parameter of the LED light source 6 according to the physiological parameter. The luminous parameter includes at least one of luminous brightness, a luminous color, or a luminous frequency. The physiological parameter includes at least one of a heart rate, a blood pressure, or a body temperature.

In an embodiment, the user of the flexible display may attach the flexible display to the body, and the physiological parameter detection module 8 detects the heart rate, blood pressure, and body temperature of the user. The drive circuit 102 may adjust the luminous frequency of the LED light source 6 according to the heart rate to enable the LED light source 6 to flash. In an embodiment, the flash frequency may be the same as the heart rate. The drive circuit 102 may also adjust the luminous color of the LED light source 6 according to the body temperature. For example, the LED light source 6 may emit green light in a case where the body temperature is normal; the LED light source 6 may emit yellow light in a case where the user has a low fever; and the LED light source 6 may emit red light in a case where the user has a high fever. The drive circuit 102 may also adjust the luminous brightness of the LED light source 6 according to the blood pressure. In an embodiment, the higher the blood pressure is, the greater the brightness is.

Since the flexible display provided in this application is resistant to bending, has low power consumption, and is lightweight and portable, the flexible display may be attached to any position of a body. The flexible display reacts to the physiological parameter so that the user can understand the change of the physiological parameter in a visual manner.

In an embodiment, referring to FIG. 3, the flexible display further includes an ambient parameter detection module 9. The ambient parameter detection module 9 is configured to detect an ambient parameter and send the ambient parameter to the drive circuit 102. The drive circuit 102 is configured to adjust the luminous parameter of the LED light source 6 according to the ambient parameter. The luminous parameter includes at least one of luminous brightness, a luminous color, or a luminous frequency. The ambient parameter includes at least one of an ambient volume, ambient brightness, an ambient temperature, or an ambient humidity.

In an embodiment, the drive circuit 102 may adjust one or more of the luminous brightness, the luminous color, or the luminous frequency according to one or more of the ambient volume, the ambient brightness, the ambient temperature, or the ambient humidity. In an embodiment, in a case of detecting that the ambient volume is relatively high, the luminous frequency may be adjusted to be increased. In a case where the ambient temperature and the ambient humidity are relatively high, the luminous color may be adjusted. When the temperature and humidity are both in appropriate ranges, the luminous color is one color. When one of the temperature or the humidity exceeds the corresponding appropriate range, the luminous color is adjusted to another color. When the temperature and the humidity both exceed the appropriate ranges, the luminous color is adjusted to another color. The luminous brightness may be adjusted to change as the ambient brightness changes. For example, the luminous brightness may be gradually increased as the ambient brightness becomes greater. The luminous parameter of the flexible display may be adjusted to reflect changes in the ambient parameter so that the user can visually understand the ambient parameter.

Figure 4:
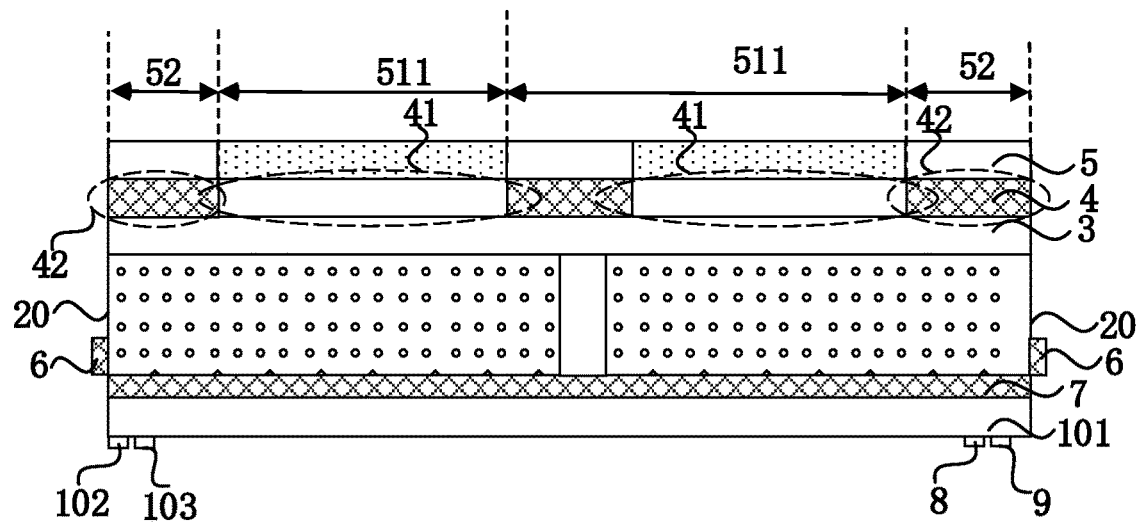
FIG. 4 is a schematic view of another flexible display according to an embodiment.

FIG. 4 is a schematic view of another flexible display according to an embodiment. Referring to FIG. 4, the first pattern area 51 includes n sub-pattern areas 511 of different colors. The flexible light guide film 2 includes n sub-light-guide films 20. A vertical projection of each sub-light-guide film 20 on the first color film 5 covers a respective one of the n sub-pattern areas 511. n is an integer greater than or equal to 2.

In an embodiment, different sub-pattern areas 511 have different pattern colors, and LED light sources 6 of different colors are needed for illumination. Each sub-light-guide film 20 corresponds to one sub-pattern area 511 and is configured to transmit the light of a color corresponding to the one sub-pattern area 511. The first pattern area includes n sub-pattern areas 511 of different colors, and the flexible light guide film includes n sub-light-guide films 20 so that the display diversity of the flexible display can be improved.

In an embodiment, in the preceding implementation manner, the case where the flexible display is a single-sided display is used as an example for the description of the flexible display, and the flexible display with the double-sided display is described below.

Figure 5:
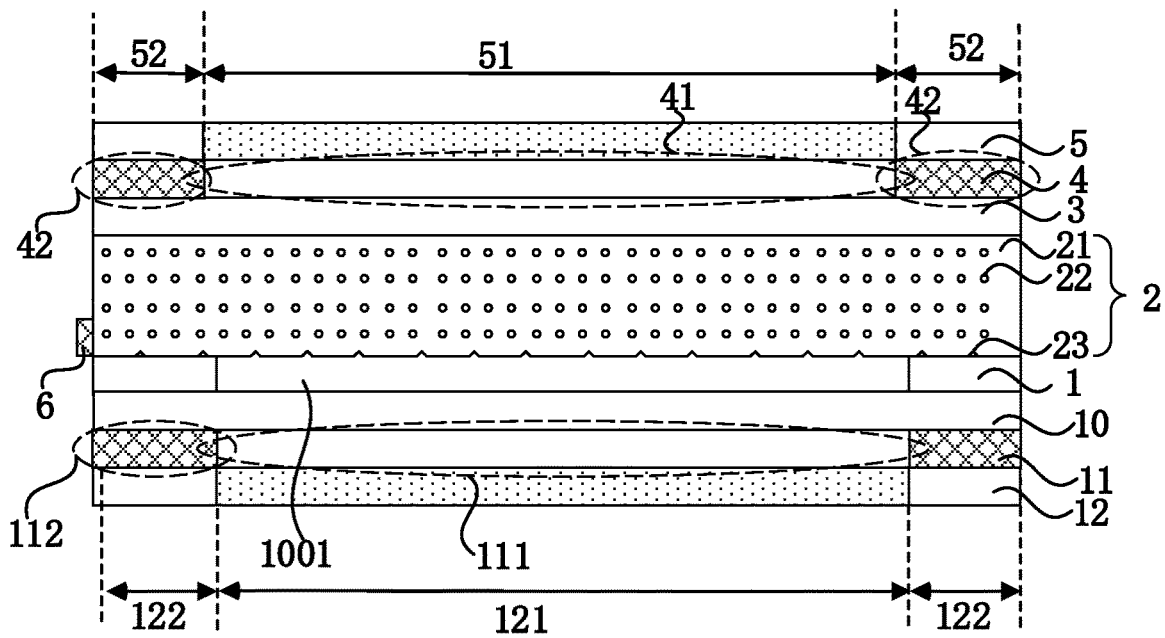
FIG. 5 is a schematic view of another flexible display according to an embodiment.

FIG. 5 is a schematic view of another flexible display according to an embodiment. Referring to FIG. 5, the flexible display further includes a second light-scattering film 10, a second light-shielding film 11, and a second color film 12, the three are sequentially stacked. The second light-scattering film 10 is disposed on one side of the flexible substrate 1 away from the flexible light guide film 2. The second light-shielding film 11 is disposed on one side of the second light-scattering film 10 away from the flexible substrate 1. The second color film 12 includes a second pattern area 121 and second non-display areas 122. The second light-shielding film 11 includes a second light-transmittance area 111 and a second light-shielding area 112. A vertical projection of the second light-transmittance area 111 on the second color film 12 covers the second pattern area 121, and a vertical projection of the second light-shielding area 112 on the second color film 12 covers the corresponding second non-display area 122. The flexible substrate 1 includes a hollow area 1001, and a vertical projection of the hollow area 1001 on the second color film 12 covers the second pattern area 121.

In an embodiment, the flexible substrate 1 at the hollow area 1001 is removed. After the light is emitted through the flexible light guide film 2, the light is directly projected on the second light-scattering film 10 through the hollow area 1001. The second light-scattering film 10 further uniformly scatters the light so that the light is emitted more uniformly. The LED light source 6 is converted into a surface light source by using the flexible light guide film 2 and the second light-scattering film 10, which is safer for human eyes and more comfortable for viewing. The light emitted from the second light-scattering film 10 irradiates the second pattern area 121 through the second light-transmittance area 111 of the second light-shielding film 11 to illuminate the pattern of the second pattern area 121, achieving the double-sided display of the flexible display.

To improve the light-emitting uniformity of the flexible display when the flexible display is bent at a large angle, the structure of the flexible light guide film is further improved in the present application. The improvements are described below.

Figure 6:
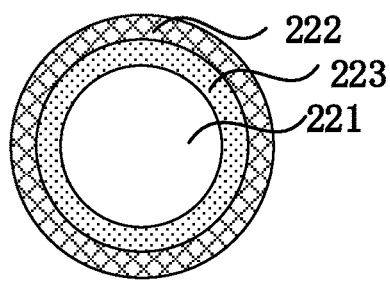
FIG. 6 is a schematic view of a multilayer-structured nanoscale light-scattering particle according to an embodiment.

FIG. 6 is a schematic view of a multilayer-structured nanoscale light-scattering particle according to an embodiment. The multilayer-structured nanoscale light-scattering particle further includes an inorganic layer 223 disposed between a second polymer layer 222 and the nanoparticle 221. The inorganic layer 223 coats the nanoparticle 221.

In an embodiment, adding the inorganic layer 223 can increase the effect such as light refraction between the nanoparticle 221 and the inorganic layer 223, so the multilayer-structured nanoscale light-scattering particles have a better light-scattering effect, and thus the flexible light guide film has a better light transmittance effect.

In an embodiment, the inorganic layer 223 includes titanium dioxide.

In an embodiment, the inorganic layer 223 may be a titanium dioxide layer. The film formation process of the titanium dioxide layer on the surface of the nanoscale amorphous silicon dioxide particle and the nanoscale cerium oxide particle is relatively simple, and the light-scattering performance of each multilayer-structured nanoscale light-scattering particle is better after the film formation. By coating nanoscale amorphous silicon dioxide or nanoscale cerium oxide with titanium dioxide, it can be ensured that the light is emitted uniformly when the flexible light guide film is bent at a large angle, while reducing the process cost and improving the yield.

In an embodiment, the second polymer layer 222 uses a material of styrene or acrylate. The film formation process of styrene and acrylate on the surface of nanoscale amorphous silicon dioxide, nanoscale cerium oxide, and titanium dioxide is relatively simple, and the film thickness is more uniform. By coating the nanoscale amorphous silicon dioxide (nanoscale cerium oxide) and the titanium dioxide with the styrene and acrylate, it can be ensured that the light is emitted uniformly when the flexible light guide film is bent at a large angle, while reducing the process cost and improving the yield.

In an embodiment, the first polymer film 21 uses at least one material of polyethylene (PE), polypropylene (PP), polystyrene (PS), polyvinyl chloride (PVC), polycarbonate (PC), polyurethane (PU), polytetrafluoroethylene (PTFE), polyethylene terephthalate (PET), polyoxymethylene (POM), polyimide (PI), polyimide amide, polyetherimide (PEI), polyethylene naphthalate (PEN), polyether ether ketone (PEEK), cyclic olefin polymer (COP), or polyacrylate (PAC).

In an embodiment, the preceding polymer has a relatively good light transmittance, a relatively good bending resistance after the film formation, a good film formation flatness, and a relatively simple film formation process. By using the preceding materials in the first polymer film, it can be further ensured that the flexible light guide film emits light uniformly when bent at different angles.

In an embodiment, the first polymer film 21 has a film thickness of 0.05-2 mm.

In an embodiment, in a case where the thickness of the first polymer film 21 is too thick, it is not conducive to reducing the thickness of the flexible display and bending the flexible light guide film. And the light transmittance of the first polymer film 21 may be affected in the case of the too-thick thickness. In a case where the thickness of the first polymer film 21 is too thin, the requirements for the film formation process are too high. By configuring the film thickness of the first polymer film 21 to be 0.05-2 mm, the good bending resistance and light transmittance of the flexible light guide film can be ensured, while the difficulty of the film formation process can be reduced, and it is beneficial to the lightweight and thinness of the flexible display.

In an embodiment, the flexible light guide film 2 further includes a silane coupling agent and a first polymer. In the flexible light guide film 2, the multilayer-structured nanoscale light-scattering particles 22 has a mass ratio of 1-10%, the first polymer has a mass ratio of 88%-99%, and the silane coupling agent has a mass ratio of 0.1-2%.

Figure 7:
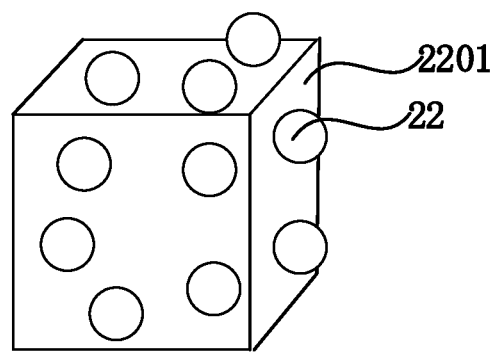
FIG. 7 is a schematic view of a polymer masterbatch according to an embodiment.

In an embodiment, the silane coupling agent is configured to couple the multilayer-structured nanoscale light-scattering particles 22 with chemical bonds of a first polymer masterbatch 2201 so that the nanoscale light-scattering particles 22 are uniformly distributed on the surface of the first polymer masterbatch, and the multilayer-structured nanoscale light-scattering particles 22 are uniformly distributed in the first polymer film. FIG. 7 is a schematic view of a polymer masterbatch according to an embodiment. Referring to FIG. 7, the multilayer-structured nanoscale light-scattering particles 22 are uniformly distributed on the surface of the first polymer masterbatch 2201.

Table 1 is light-emitting data of the flexible light guide film 2 in this embodiment. The flexible light guide film 2 has a size of 100 mm*100 mm and a thickness of 0.85 mm. Nanoscale cerium oxide is used as the core in each multilayer-structured nanoscale light-scattering particle. Nanoscale cerium oxide is coated by titanium dioxide and the second polymer layer. In this embodiment, the case where the transmitted light is blue light is used as an example, when two ends of the flexible light guide film are bent at different bending angles, the light-emitting intensity at a position where the flexible light guide film has the largest extent of bending is tested. The light-emitting intensity in a case of the bending angle being 0 degree is the light-emitting intensity at the center of the flexible light guide film. It can be seen from Table 1 that with an increase of the bending angle of the flexible light guide film provided in this embodiment, the light-emitting intensity at the position where the flexible light guide film has the largest extent of bending does not change much, and the light-emitting uniformity is still relatively good in a case of a large being angle. Therefore, by using the flexible light guide film 2 provided in this embodiment, the flexible display still has a relatively good display effect when the flexible display is bent at a large angle.

TABLE 1

| Serial Number | Bending Angle at Two Ends (degree) | Light-Emitting Intensity (Cd/m$^2$) | Luminous Color |
| --- | --- | --- | --- |
| 1 | 0 | 1185 | Blue light |
| 2 | 10 | 1180 | Blue light |
| 3 | 20 | 1179 | Blue light |
| 4 | 30 | 1181 | Blue light |
| 5 | 40 | 1179 | Blue light |
| 6 | 50 | 1178 | Blue light |
| 7 | 60 | 1176 | Blue light |
| 8 | 70 | 1174 | Blue light |
| 9 | 80 | 1174 | Blue light |
| 10 | 90 | 1173 | Blue light |
| 11 | 100 | 1171 | Blue light |
| 12 | 110 | 1170 | Blue light |
| 13 | 120 | 1168 | Blue light |
| 14 | 130 | 1164 | Blue light |
| 15 | 140 | 1163 | Blue light |
| 16 | 150 | 1161 | Blue light |
| 17 | 160 | 1158 | Blue light |
| 18 | 170 | 1149 | Blue light |
| 19 | 180 | 1140 | Blue light |

In an embodiment, the multilayer-structured nanoscale light-scattering particles 22 in the first polymer film 21 have a gradually increased concentration along a direction away from the LED light source.

In an embodiment, when the flexible light guide film 2 has a relatively large area, the light intensity decreases to a certain extent as the distance from the LED light source increases. To further improve the light-emitting uniformity of the flexible light guide film 2, the larger the distance from the LED light source is, the larger the concentration of the multilayer-structured nanoscale light-scattering particles 22 is. Exemplarily, the concentration of the multilayer-structured nanoscale light-scattering particles 22 may be increased in a gradient manner. The light-scattering performance can be further improved by increasing the concentration of the multilayer-structured nanoscale light-scattering particles 22 so that the flexible light guide film at a relatively far distance from the light source has better light-scattering performance, and the light-emitting intensity at a relatively far distance from the light source can be improved, and thus the light emitted from the entire light-emitting surface of the flexible light guide film is more uniform.

In an embodiment, the preparation process of the flexible light guide film may include: coating the inorganic layer 223 on the surface of the nanoparticle, and coating the second polymer layer 222 on the surface of the inorganic layer 223 to obtain a multilayer-structured nanoscale light-scattering particle 22; coupling multilayer-structured nanoscale light-scattering particles 22 with the chemical bonds of the first polymer masterbatch 2201 so that the multilayer-structured nanoscale light-scattering particles 22 are uniformly distributed on the surface of the first polymer masterbatch to obtain the polymer masterbatch loaded with the nanoscale light-scattering particles; forming the first polymer film 21 by using the polymer masterbatch loaded with the nanoscale light-scattering particles; and forming multiple light-scattering microstructures on the surface of the first polymer film 21 to form the flexible light guide film 2.

The nanoscale amorphous silicon dioxide may be prepared by using the methods such as the sol-gel method, the hydrothermal synthesis method, the gas phase method, the microemulsion reaction method, the azeotropic distillation method, and the supergravity reaction method. In an embodiment, the nanoscale amorphous silicon dioxide may be prepared by using the sol-gel method. TEOS is used as the silicon source precursor, ethanol and deionized water are used as solvents, hydrochloric acid and aqueous ammonia are used as catalysts, and the following molar ratios of raw materials are applied: TEOS:EtOH:H$_2$O=1:6:4.5; TEOS:NH$_4$OH:HCl=1:2×10$^{-2}$:1.5×10$^{-3}$. The nanoscale cerium dioxide nanoparticles may be prepared by using the hydrothermal method with Ce(NO$_3$)$_3$·6H$_2$O and cetyl trimethyl ammonium bromide (CTAB) as raw materials.

The coating process of the nanoparticles may be described below.

1. The preparation process of a composite core-shell structure of titanium dioxide coating nanoscale amorphous silicon dioxide is described below.

Water and isopropanol are mixed at a volume ratio of 1:1 to obtain a mixed isopropanol solution, 0.5 mmol of tetraethyl titanate is dispersed in 50 mL of the mixed isopropanol solution to form a titanium source solution, and the titanium source solution has a concentration of 0.01 mmol/mL. The reaction temperature is kept at 30° C., 15 mL of a nanoscale amorphous silicon dioxide solution is added into the mixed solution, and the reaction is kept for 12 h. The obtained product is subjected to centrifugal separation for 15 min. After precipitation and drying, the material having the composite core-shell structure of the amorphous titanium dioxide coating nanoscale amorphous silicon dioxide is obtained.

2. The preparation process of a composite core-shell structure of titanium dioxide coating nanoscale cerium dioxide is described below.

Water and isopropanol are mixed at a volume ratio of 1:1, and 0.5 mmol of tetraethyl titanate is dispersed in 50 mL of the mixed isopropanol solution. The titanium source solution has a concentration of 0.01 mmol/mL. The reaction temperature is kept at 30° C., 15 mL of a nanoscale amorphous cerium dioxide solution is added into the mixed solution, and the reaction is kept for 12 h. The obtained product is subjected to centrifugal separation for 15 min. After precipitation and drying, the material having the composite core-shell structure of the amorphous titanium dioxide coating nanoscale amorphous cerium dioxide is obtained.

3. The preparation process of a composite core-shell structure of styrene-titanium dioxide coating nanoscale amorphous silicon dioxide is described below.

200 mg of the material having the composite core-shell structure of titanium dioxide coating nanoscale amorphous silicon dioxide and 1700 mL of sodium lauryl sulfate aqueous solution are added into a reaction device, dispersion is performed by using an ultrasonic generator for 10 min, and then 5 mL of styrene monomer is added. After 10 min of adding nitrogen to exhaust oxygen, the polymerization reaction is initiated by using the ultrasonic generator. The temperature of the circulating water bath is 40° C., the reaction is stopped after a preset time, and a composite emulsion of the material having the composite core-shell structure of styrene-titanium dioxide coating nanoscale amorphous silicon dioxide is obtained. Part of the emulsion is frozen and demulsified by using absolute ethanol. After leaching, washing, and vacuum drying, extraction is performed in a Soxhlet extractor for 80 h by using toluene to remove the homopolymer from the part of the emulsion. After drying, the composite material having the composite core-shell structure of styrene-titanium dioxide coating nanoscale amorphous silicon dioxide is obtained.

4. The preparation process of a composite core-shell structure of styrene-titanium dioxide coating nanoscale cerium dioxide is described below.

200 mg of the material having the composite core-shell structure of titanium dioxide coating nanoscale cerium dioxide and 1700 mL of sodium lauryl sulfate aqueous solution are added into the reaction device, dispersion is performed by using an ultrasonic generator for 10 min, and then 5 mL of styrene monomer is added. After 10 min of adding nitrogen to exhaust oxygen, the polymerization reaction is initiated by using the ultrasonic generator. The temperature of the circulating water bath is 40° C., and the reaction is stopped after a certain time so that a composite emulsion of the material having the composite core-shell structure of the styrene-titanium dioxide coating nanoscale cerium dioxide is obtained. Part of the emulsion is frozen and demulsified by using absolute ethanol. After leaching, washing, and vacuum drying, extraction is performed in a Soxhlet extractor for 80 h by using toluene so that the homopolymer is removed from the part of the emulsion. After drying, the material having the composite core-shell structure of styrene-titanium dioxide coating nanoscale cerium dioxide is obtained.

The preparation process of a composite core-shell structure of acrylate-titanium dioxide coating nanoscale amorphous silicon dioxide is described below.

Water, an emulsifier, and a dispersant are added into a beaker, and the pH value is adjusted to 9 by using aqueous ammonia, then the material having the composite core-shell structure of titanium dioxide coating nanoscale amorphous silicon dioxide is added, and the ultrasonic dispersion process is performed for 15 min. The ultrasonic dispersed solution is transferred to a four-necked flask, stirred, and heated to 80° C., and the acrylate monomer mixture, an emulsifier, and an initiator solution are dripped into the flask. After the dripping is completed and the temperature is kept for 30 min, the filtering is performed to obtain the material having the composite core-shell structure of acrylate-titanium dioxide coating nanoscale amorphous silicon dioxide.

6. The preparation process of a composite core-shell structure of acrylate-titanium dioxide coating nanoscale cerium dioxide is described below.

Water, an emulsifier, and a dispersant are added to a beaker, and the pH value is adjusted to 9 by using aqueous ammonia, then the material having the composite core-shell structure of titanium dioxide coating nanoscale cerium dioxide is added, and the ultrasonic dispersion process is performed for 15 min. The ultrasonic dispersed solution is transferred to a four-necked flask, stirred and heated to 80° C., and the acrylate monomer mixture, an emulsifier, and an initiator solution are dripped into the flask. After the dripping is completed and the temperature is kept for 30 min, then the filtering is performed to obtain the material having the composite core-shell structure of acrylate-titanium dioxide coating nanoscale cerium dioxide.

Furthermore, the step of forming the first polymer film by using the polymer masterbatch loaded with the nanoscale light-scattering particles includes adding the first polymer masterbatches into a film blowing machine, and adjusting the speed of adding the polymer masterbatches loaded with the nanoscale light-scattering particles into the film blowing machine to gradually increase the concentration of the multilayer-structured nanoscale light-scattering particles along a direction of the first side of the first polymer film pointing to the second side of the first polymer film. The first side is the light incident surface.

Furthermore, the step of forming the first polymer film by using the polymer masterbatch loaded with the nanoscale light-scattering particles may further include pressing the polymer masterbatch loaded with the nanoscale light-scattering particles to form the first polymer film. The concentration of the multilayer-structured nanoscale light-scattering particles in the first polymer film may be adjusted by adjusting the ratio of the number of the first polymer masterbatches to the number of the polymer masterbatches loaded with the nanoscale light-scattering particles so that the concentration of the multilayer-structured nanoscale light-scattering particles gradually increases along the direction of the first side of the first polymer film pointing to the second side of the first polymer film. The first side is the light incident surface.

Furthermore, the multiple light-scattering microstructures may be formed by using the methods such as the extrusion molding method, the roller method, the laser engraving method, the ink screen printing method, the chemical etching method, the nanoscale addition method, and the direct injection molding method.

What is claimed is:
1. A flexible display, comprising:
   a flexible substrate, a flexible light guide film, a first light-scattering film, a first light-shielding film, a first color film, and a light-emitting diode (LED) light source disposed on a side of the flexible light guide film;
   wherein the flexible substrate, the flexible light guide film, the first light-scattering film, the first light-shielding film, and the first color film are sequentially stacked;
   wherein the first color film comprises a first pattern area and a first non-display area, the first light-shielding film comprises a first light-shielding area and a first light-transmittance area, a vertical projection of the first light-transmittance area on the first color film covers the first pattern area, and a vertical projection of the first light-shielding area on the first color film covers the first non-display area, and
   wherein the flexible light guide film comprises a first polymer film, the first polymer film comprises multilayer-structured nanoscale light-scattering particles uniformly distributed; each of the multilayer-structured nanoscale light-scattering particles comprises a nanoparticle and a second polymer layer coating the nanoparticle, and a particle size of each of the multilayer-structured nanoscale light-scattering particles is less than one-tenth of a wavelength of light emitted by the LED light source; the nanoparticle comprises nanoscale amorphous silicon dioxide or nanoscale cerium oxide; and a surface of the first polymer film is provided with a plurality of light-scattering microstructures.

2. The flexible display of claim 1, further comprising a light-reflecting film, wherein the light-reflecting film is disposed between the flexible light guide film and the flexible substrate.

3. The flexible display of claim 1, wherein the flexible substrate comprises a substrate, a drive circuit disposed on the substrate, and a power supply disposed on the substrate; and the drive circuit is electrically connected to the power supply and the LED light source, respectively, and the drive circuit is configured to drive the LED light source to emit the light.

4. The flexible display of claim 3, further comprising a physiological parameter detection module, wherein the physiological parameter detection module is configured to detect a physiological parameter of a user of the flexible display and send the physiological parameter to the drive circuit; and the drive circuit is configured to adjust a luminous parameter of the LED light source according to the physiological parameter; wherein the luminous parameter comprises at least one of luminous brightness, a luminous color, or a luminous frequency, and the physiological parameter comprises at least one of a heart rate, a blood pressure, or a body temperature.

5. The flexible display of claim 3, further comprising an ambient parameter detection module, wherein the ambient parameter detection module is configured to detect an ambient parameter and send the ambient parameter to the drive circuit; and the drive circuit is configured to adjust a luminous parameter of the LED light source according to the ambient parameter; wherein the luminous parameter comprises at least one of luminous brightness, a luminous color, or a luminous frequency, and the ambient parameter comprises at least one of an ambient volume, ambient brightness, an ambient temperature, or an ambient humidity.

6. The flexible display of claim 1, wherein the first pattern area comprises n sub-pattern areas of different colors, the flexible light guide film comprises n sub-light-guide films, and a vertical projection of each of the n sub-light-guide films on the first color film covers a respective one of the n sub-pattern areas; wherein n is an integer greater than or equal to 2.

7. The flexible display of claim 1, further comprising: a second light-scattering film, a second light-shielding film, and a second color film;

wherein the second light-scattering film, the second light-shielding film, and the second color film are sequentially stacked, the second light-scattering film is disposed on a side of the flexible substrate away from the flexible light guide film, and the second light-shielding film is disposed on a side of the second light-scattering film away from the flexible substrate;

wherein the second color film comprises a second pattern area and a second non-display area, the second light-shielding film comprises a second light-shielding area and a second light-transmittance area, a vertical projection of the second light-transmittance area on the second color film covers the second pattern area, and a vertical projection of the second light-shielding area on the second color film covers the second non-display area; and wherein the flexible substrate comprises a hollow area, and a vertical projection of the hollow area on the second color film covers the second pattern area.

8. The flexible display of claim 3, wherein the power supply comprises a button cell.

9. The flexible display of claim 1, wherein each of the multilayer-structured nanoscale light-scattering particles further comprises an inorganic layer disposed between the second polymer layer and the nanoparticle, and the inorganic layer coats the nanoparticle.

10. The flexible display of claim 9, wherein the inorganic layer comprises titanium dioxide; and the second polymer layer uses styrene or acrylate; the first polymer film uses at least one of the following materials: polyethylene, polypropylene, polystyrene, polyvinyl chloride, polycarbonate, polyurethane, polytetrafluoroethylene, polyethylene terephthalate, polyoxymethylene, polyimide, polyimide amide, polyetherimide, polyethylene naphthalate, polyetherether-ketone, cyclic olefin polymer, or polyacrylate.

11. The flexible display of claim 1, wherein the first polymer film has a film thickness of 0.05-2 mm.

12. The flexible display of claim 1, wherein the flexible light guide film further comprises a silane coupling agent and a first polymer; and wherein in the flexible light guide film, the multilayer-structured nanoscale light-scattering particles has a mass ratio of 1-10%, the first polymer has a mass ratio of 88%-99%, and the silane coupling agent has a mass ratio of 0.1-2%.

13. The flexible display of claim 1, wherein the multilayer-structured nanoscale light-scattering particles in the first polymer film have a gradually increased concentration along a direction away from the LED light source.

* * * * *